(12) United States Patent
Reial et al.

(10) Patent No.: US 8,761,144 B2
(45) Date of Patent: Jun. 24, 2014

(54) HS-PDSCH BLIND DECODING

(75) Inventors: Andres Reial, Malmö (SE); Lennart Andersson, Hjärnarp (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 1417 days.

(21) Appl. No.: 11/952,002

(22) Filed: Dec. 6, 2007

(65) Prior Publication Data

US 2009/0003301 A1    Jan. 1, 2009

Related U.S. Application Data (60) Provisional application No. 60/946,872, filed on Jun. 28, 2007.

(51) Int. Cl.
H04B 7/216 (2006.01)

(52) U.S. Cl.
USPC .......................................................... 370/342

(58) Field of Classification Search
USPC .......................................................... 370/342
See application file for complete search history.

(56) References Cited

U.S. PATENT DOCUMENTS

| | | | |
|---|---|---|---|
| 5,230,003 A | 7/1993 | Dent et al. | |
| 6,574,775 B1* | 6/2003 | Chouly | 714/800 |
| 6,671,326 B1 | 12/2003 | Tortelier | |
| 6,697,441 B1* | 2/2004 | Bottomley et al. | 375/340 |
| 6,771,690 B2 | 8/2004 | Heikkila | |
| 7,042,963 B1* | 5/2006 | Raith et al. | 375/341 |
| 7,054,288 B2 | 5/2006 | Sternberg et al. | |
| 2002/0108090 A1 | 8/2002 | Ariel et al. | |
| 2003/0106012 A1* | 6/2003 | Hewitt | 714/780 |
| 2004/0042492 A1* | 3/2004 | Suzuki et al. | 370/473 |
| 2004/0085989 A1* | 5/2004 | Boumendil et al. | 370/442 |
| 2004/0131107 A1 | 7/2004 | Wang | |
| 2006/0202893 A1 | 9/2006 | Goldberg et al. | |
| 2006/0256758 A1 | 11/2006 | Malkamaki et al. | |
| 2008/0130492 A1* | 6/2008 | Kuo | 370/226 |
| 2008/0304588 A1* | 12/2008 | Pi | 375/260 |

FOREIGN PATENT DOCUMENTS

| | | |
|---|---|---|
| GB | 2389021 A | 11/2003 |
| WO | 0035137 A | 6/2000 |

OTHER PUBLICATIONS

Andersson, L. et al. "Reliable Decoding of a High-Speed Shared Control Channel." U.S. Appl. No. 11/944,773, filed Nov. 26, 2007.
Garcia-Frias, J. et al. "Blind Turbo Decoding and Equalization." 1999 IEEE 49th IEEE Vehicular Technology Conference, vol. 3, May 16-20, 1999, pp. 1881-1885.

(Continued)

*Primary Examiner* — Noel Beharry
(74) *Attorney, Agent, or Firm* — Coats & Bennett, P.L.L.C.

(57) ABSTRACT

The number of blind decoding operations in a wireless communication receiver is reduced. In one embodiment, a candidate set of transport formats is formed by eliminating one or more allowed transport formats, thus reducing the number of decode operations to be performed. In another embodiment, a received data transmission is partially decoded according to each of a plurality of transport formats, and decode quality metrics associated with each transport format are inspected. Only the transport formats yielding sufficiently high quality metrics are utilized to fully decode the transmission. In other embodiments, upon failure to successfully decode a received transmission, it is assumed to be a retransmission with a missed control transmission, and one or more transport formats specifying the position of a previous transmission in a buffer are added to the candidate set of transport formats. The received retransmission and previously received transmission are then HARQ combined and decoded.

19 Claims, 6 Drawing Sheets

(56) References Cited

OTHER PUBLICATIONS

Gunther, J. et al. "Blind Turbo Equalization Using a Generalized LDPC Decoder." 2004 IEEE 11th Digital Signal Processing Workshop and the 3rd IEEE Signal Processing Education Workshop 2004, Aug. 1-4, 2004, pp. 206-210.
Souza, R. D. et al. "Semi-Blind Combined Detection and Turbo Decoding for Unknown Block Fading Channels." 2005 IEEE 61st Vehicular Technology Conference (VTC 2005-Spring), vol. 3, May 30-Jun. 1, 2005, pp. 1595-1599.
Yang, Y. et al. "Blind Turbo Multiuser Detection for Long-Code Multipath CDMA." IEEE Transactions on Communications, vol. 50, Issue 1, Jan. 2002, pp. 112-125.
Neugebauer, S. et al. "A Turbo-Driven Known-Mobulus Blind Equalization Method." 2004 IEEE 5th Workshop on Signal Processing Advances in Wireless Communications, Jul. 11-14, 2004, pp. 36-40.
HSPA+ Technology Introduction. Application Note 1MA121. Available at: http://www.mwjournal.com/BGDownload/1MA121_0E.pdf.
3GPP TS 25.308. 3rd Generation Partnership Project; Technical Specification Group Radio Access Network; High Speed Downlink Packet Access (HSDPA); Overall description; Stage 2 (Release 7).
3GPP TS 25.903. 3rd Generation Partnership Project; Technical Specification Group Radio Access Network; Continuous Connectivity for Packet Data Users (Release 7).
UMTS Evolution from 3GPP Release 7 to Release 8 HSPA and SAE/LTE. Jul. 2007. Available from: http://www.3gamericas.org/English/index.cfm.

* cited by examiner

HS-PDSCH BLIND DECODING

This application claims priority to provisional patent application Ser. No. 60/946,872, filed Jun. 28, 2007, and incorporated by reference herein in its entirety.

FIELD OF THE INVENTION

The present invention generally relates to wireless communication networks, and particularly relates to blind decoding of a communication channel, such as blind decoding of the high-speed physical downlink shared channel (HS-PDSCH) used in providing HSDPA services in Wideband CDMA (WCDMA) networks.

BACKGROUND

Universal Mobile Telecommunications System (UMTS) is a third-generation (3G) wireless communication technology. The radio access network of UMTS, the UMTS Terrestrial Radio Access Network (UTRAN), provides wireless connectivity for both circuit-switched and packet-switched traffic between User Equipment (UE) and the core network, via Radio Network Controllers (RNC). Each RNC controls one or more Base Stations (BS), which provide the air interface connectivity to mobile UEs. Wideband Code Division Multiple Access (WCDMA) is one technology employed in UTRAN implementation.

High-Speed Downlink Packet Access (HSDPA) is a mobile telephony communications protocol for delivering packet data at high transfer speed and capacity. Downlink channels (i.e., transferring data from BS to UE) in the HSPDA protocol lack the variable spreading factor and fast power control of traditional CDMA, and instead use adaptive modulation and coding, fast packet scheduling at the BS, and transmit at full residual power. Hybrid Automatic Repeat-Request (HARQ) is employed for fast retransmission of corrupted packets. In particular, HSDPA in WCDMA is supported by a physical control channel, high speed shared control channel (HS-SCCH), and a high-speed physical downlink shared channel, (HS-PDSCH).

Release 7 of the UTRAN specification defines "continuous connectivity for packet data users," or simply, Continuous Packet Connectivity (CPC). The original objective of CPC was to enhance system capacity to support a very large number of packet-oriented users by reducing signaling overhead and uplink interference. This would make it possible to keep many packet data users in the CELL_DCH state for long time periods, without reducing the cell throughput. These packet data users would experience significantly reduced delays as time-consuming reconnections are avoided, providing a user experience similar to fixed broadband.

The objective of CPC has expanded and now includes reduction of the downlink overhead and reduction of the user equipment (UE) power consumption. The CPC solution includes a new uplink dedicated physical control channel (DPCCH) slot format, discontinuous uplink transmission, discontinuous downlink reception and HS-SCCH-less operation.

The HS-SCCH-less operation is intended for low data rate users such as voice over IP (VoIP). The goal is to reduce transmission of downlink HS-SCCH, which would generate a significant amount of overhead for small data packets, by only transmitting the HS-SCCH during retransmissions (maximum two retransmissions). Since the HS-SCCH normally precedes data transmission on the HS-PDSCH and includes information such as the transport format, in CPC mode UE must employ blind decoding among four predefined block sizes. The new feature is supported by a new CRC computation method (Type 2) for the HS-DSCH and a new HS-SCCH format (Type 2). The UE should also be capable of receiving and decoding transmission according to the legacy (Rel-6) HSDPA formats, referred to as Type 1.

HS-SCCH-less operation is configured by the serving radio network controller (SRNC) per UE, by prescribing up to four transport block sizes using up to two HS-PDSCH codes. A UE should still be able to monitor up to four HS-SCCH transmissions (Type 1 and Type 2) and should also be able to detect if a received HS-SCCH transmission is of Type 1 or Type 2. Additionally, a UE should decode up to two HS-PDSCH transmissions of Type 2. Retransmissions should use the same HS-SCCH type and HS-PDSCH type (Type 1 or Type 2) as in the first transmission.

In the HS-SCCH-less mode, the first transmission is not signaled via the HS-SCCH. Instead, the UE must demodulate the symbols on 1 or 2 predetermined HS-PDSCH codes and perform blind decoding of the received symbols. There are four possible transport formats. The UE should perform rate matching corresponding to each of the formats to decode the resulting sequence, and check the CRC that is masked with the UE ID. If the CRC check on a candidate sequence is successful, the sequence is accepted by the UE and an ACK is sent to the BS. If the blind detection of the first transmission is unsuccessful, the BS will signal the subsequent retransmission using the Type 2 HS-SCCH. The Type 2 HS-SCCH transmission thus precedes the second and third HS-PDSCH transmissions in HS-SCCH-less operation.

Part one comprises, as in Release-6,
channelization code set (7 bits)
   only values corresponding to one and two codes
modulation index (1 bit);
   '0' indicating QPSK
Part two is modified in Release-7, and comprises
special information type (6 bits)
   '111110' indicating HS-SCCH less operation. Note that the first six bits of part 2 in REl-6 HS-SCCH is the transport block size. The value '111110' would correspond to a very high code rate that would not be used in practice.
the special information (7 bits)
   transport block size (2 bits)
   pointer to the previous transmission (3 bits); indicating 6-13 subframes since last transmission
   second or third transmission (1 bit)
   reserved bit (1 bit)
The redundancy version for the second transmission is three, and for the third transmission is four.

In the case that no HS-SCCH transmission is detected and HS-SCCH-less operation is activated, up to four different HS-DSCH transport formats should be blindly decoded. In addition, in HS-SCCH mode, if an HS-SCCH transmission is not detected by the UE, HS-PDSCH retransmissions must also be blind decoded. Blind decoding up to four transport formats requires significant decoding resources in the UE. By reducing the total number of blind HS-DSCH decoding operations in the UE, both the required hardware resources and power consumption may be reduced.

SUMMARY

Embodiments of the present invention reduce the number of blind decoding operations in a wireless communication receiver. In one embodiment, a candidate set of transport formats is formed by eliminating one or more allowed transport formats, thus reducing the number of decode operations to be performed. In another embodiment, a received data transmission is partially decoded according to each of a plurality of transport formats, and decode quality metrics associated with each transport format are inspected. Only the transport formats yielding sufficiently high quality metrics are utilized to fully decode the transmission. In other embodiments, upon failure to successfully decode a received transmission, it is assumed to be a retransmission with a missed control transmission, and one or more transport formats specifying the position of a previous transmission in a buffer are added to the candidate set of transport formats. The received retransmission and previously received transmission are then HARQ combined and decoded. Similarly, a received transmission may be a second retransmission, to be HARQ combined with a previous retransmission and/or the original transmission.

DETAILED DESCRIPTION

Figure 1:
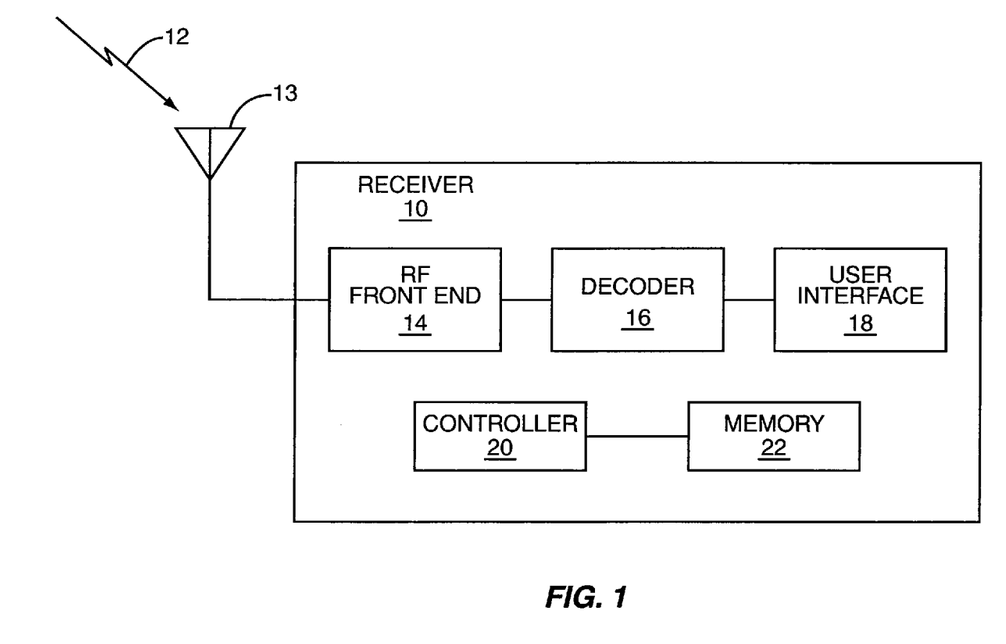
FIG. 1 is a functional block diagram of a wireless communications receiver.

FIG. 1 depicts a wireless receiver (UE) 10, receiving a wireless transmission 12 at an antenna 13. A Radio Frequency (RF) front end circuit 14 amplifies, filters, and downconverts the received transmission 12 to baseband. The baseband signal is decoded by a decode module 16, and data encoded in the transmission 12 is sent to a user interface 18 for rendering to a user, such as by sending audio to a speaker, sending video, graphics, or text data to a display, and the like. A controller 20, such as a microprocessor or Digital Signal Processor (DSP), controls the operation of the receiver 10. The controller accesses instructions from memory 22, and may store intermediate data, such as quality metrics associated with the decoder 16, to memory 22 during operation. Those of skill in the art will recognize that a functional receiver 10 may include numerous circuits and modules not depicted in FIG. 1.

The receiver 10 may operate in a wireless communications system employing Continuous Packet Connectivity mode with HS-SCCH-less operation. As described above, the receiver 10 may be more economically manufactured, and may consume less power when deployed, if the computational task of blind decoding up to four different HS-DSCH transport formats can be reduced.

In one embodiment, when numerous allowable HS-DSCH transport formats exist, the receiver 10 reduces the blind decoding task by determining a candidate set of transport formats that excludes one or more allowable transport format. Given the expected consistency of the transport format choices applied by the BS scheduler, the recently or most frequently used transport formats are more likely to be used again. Accordingly, the receiver 10 includes one or more most recently used formats in the candidate set and omits one or more not recently used formats from the candidate set. For example, the receiver 10 may omit a transport format not used in the previous Transport Time Interval (TTI). The transport formats excluded from the candidate set may be selected according to a regular, pseudo-random, or random pattern. One example of a regular pattern would be a round-robin scheme. Alternatively, the receiver 10 may maintain statistics of the transport formats utilized by the BS, and include in the candidate set one or more of the formats that are used most often. Only fairly recent statistics should be maintained, since the preferred transport formats may change over time as the cell load and the traffic patterns change.

Figure 2:
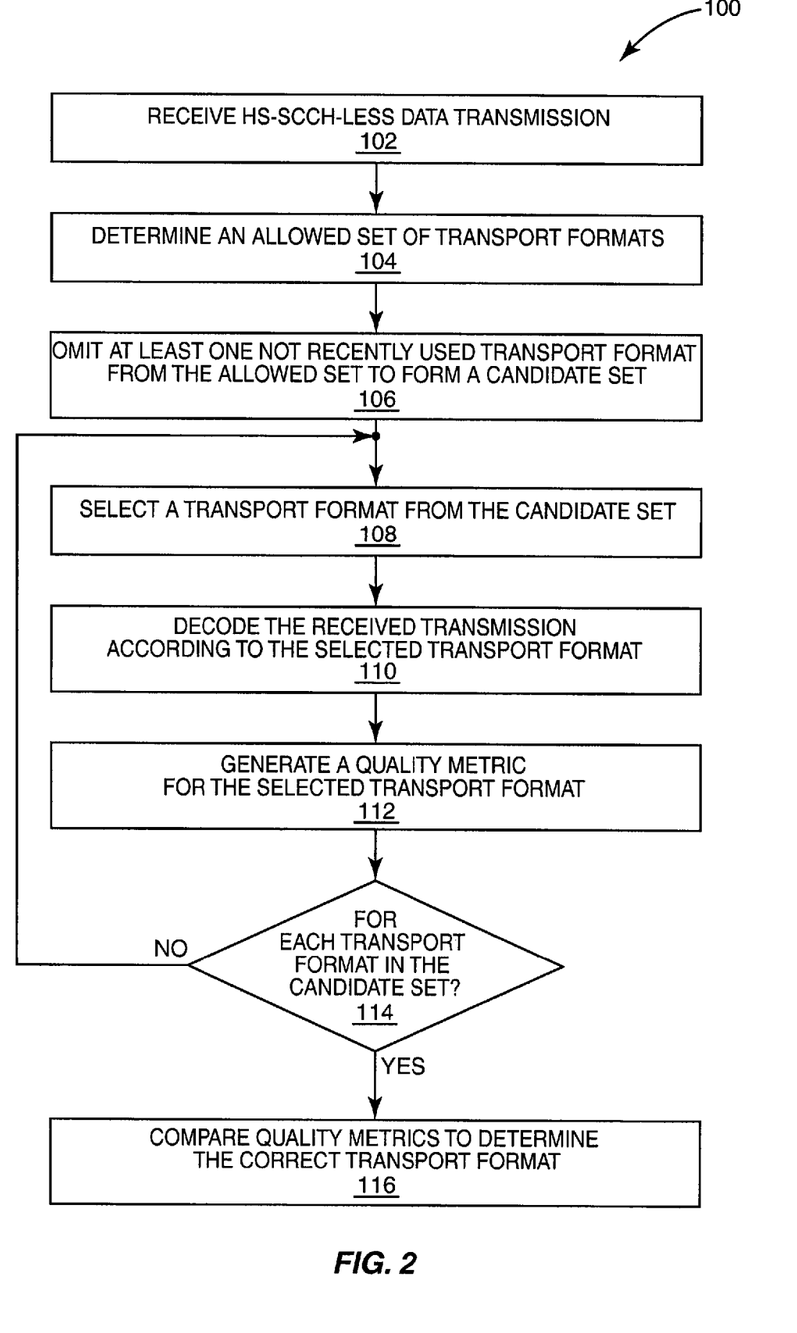
FIG. 2 is a functional block diagram of a MAP decoder.

FIG. 2 depicts a method 100 of blind decoding according to this embodiment. An HS-SCCH-less data transmission is received (block 102). The receiver 10 determines an allowed set of transport formats (block 104), such as by receiving and storing a list of allowed formats from the BS. The receiver 10 omits at least one not recently used transport format from the allowed set, to formulate a candidate set of transport formats (block 106). The receiver 10 selects a transport format from the candidate set (block 108), and decodes the received transmission according to the selected transport format (block 110). The receiver can also generates a quality metric associated with the selected transport format (block 112), such as a CRC check, bit error rate (BER), or the like. This process repeats for each transport format in the candidate set (block 114). The quality metrics are then compared to determine the correct decoding—that is, the received data transmission decoded according to the correct transport format (block 116).

Figure 3:
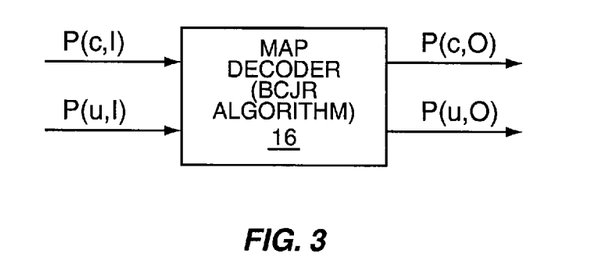
FIG. 3 is a flow diagram of a blind decoding method by reducing the number of transport formats.

In some embodiments, the decoder 16 is a maximum a posteriori (MAP) decoder 16, as depicted in FIG. 3. A MAP decoder executes an algorithm, such as the Bahl-Cocke-Jelinek-Raviv (BCJR) algorithm, that forms a posteriori probabilities (APPs) for each data bit, and then chooses the data-bit value that corresponds to the maximum a posteriori probability for that data bit. Upon receiving a corrupted code-bit sequence, the process of decision-making with APPs allows the MAP algorithm to determine the most likely information bit to have been transmitted at each bit time. MAP convolutional decoding is similar to Viterbi decoding; however, a MAP decoder outputs soft-decision values indicating not only whether a bit is decoded to a 1 or 0, but additionally the strength or confidence of that decision. The soft values may be considered quality metrics of each decoding process.

Referring to FIG. 2, which depicts the MAP decoder module 16 and its inputs and outputs, the soft value for bit i related to iteration n is denoted by $P_n(x_i,Y)$ where x is c (the coded, or demodulated bit from the previous iteration) or u (the uncoded, or information bit from the previous iteration) and Y is I (Input) or O (Output). The quality of the real quantities P(c,*) and P(u,*) may be measured in terms of their magnitudes. For bit i, a large positive or negative value for $P(x_i,Y)$ indicates that the bit is 0 or 1 respectively, with high probability. Likelihood values near zero, on the other hand, indicate that the value of the bit is uncertain.

One way to evaluate the overall soft value quality for a length-I block is to compute the mean of the magnitudes of the soft values. The quality metric is then $$C_n(x, Y) = \frac{1}{I}\sum_{i=1}^{I} |P_n(x_i, Y)|.$$

Of course, the present invention is not limited to this particular formulation of a decoding quality metric; those of skill in the art will readily recognize that other quality metrics may be formulated within the scope of the present invention.

For the correct transport format assumption and at sufficiently high SINR, both P(c) and P(u) improve, $(C_n(x,O) > C_n(x,I)$ on the average) as the decoding progresses. On the other hand, if a wrong transport format has been assumed, the code trellis is unable to refine the bit likelihood values after applying a MAP decoding iteration. Typically, $C_n(u,O) \approx C_n(u,I)$, having relatively small values, and $C_n(c,O) < C_n(c,I)$ due to the attempt to enforce the code structure on a received sequence that was not coded that way. Accordingly, the soft value quality metrics may be used to determine the proper transport format to apply in blind decoding a received HS-SCCH-less transmission.

In one embodiment, using the soft value quality metric, the decoding of a received transmission according to a plurality of candidate transport formats is performed in two steps. In a first step, only one or a few decoder iterations are run using each candidate format to select the most likely candidate(s)—those with the largest $C_n^{(k)}(c,O)$ and/or $C_n^{(k)}(u,O)$. In a second step, the reduced number of candidate formats with the best quality metrics among all the candidate formats are decoded using the full number of iterations. For example, the criterion for full decoding of some candidate k* could be that $$\frac{C_n^{(k^*)}(u, O)}{\text{mean}[C_n^{(k)}(u, O)]} > \tau$$

where $\tau$ is an implementation-specific threshold.

The received transmission is not decoded according to any candidate transport format if no candidate's quality metric is significantly better than the others, and/or the coded bit likelihoods indicate that the code structure and the received signal structure do not match, i.e., $C_n(c,O) < C_n(c,I)$. In one embodiment, the receiver 10 may force one or more most recently or most frequently used candidate transport formats k* to always be decoded regardless of its $C_n^{(k^*)}(u,O)$, unless another candidate has been decoded successfully or shows sufficiently clear indications of having the correct format.

In one embodiment, the received transmission is decoded according to multiple candidate transport formats in an interleaved manner, one or more iterations at a time. Denote the number of iterations applied at one time by N; $N < N_{max}$, the maximum number of iterations. For each candidate format k, a decoding quality metric is the change in its soft values during the most recent set of decoding iterations, e.g., $\Delta^{(k)} = C_n^{(k)}(u,O) - C_{n-N+1}^{(k)}(u,I) + C_n^{(k)}(c,O) - C_{n-N+1}^{(k)}(c,I)$ (Of course, other measures could also be used.) After processing one candidate, its quality metric $\Delta^{(k)}$ is compared to that of the other candidates. If it is higher, in a manner consistent with the behavior of the correct candidate that is converging towards a solution, another N decoding iterations may be applied to this candidate. Otherwise, the next candidate is processed, according to a round robin scheme or some other fair selection process. Because the correct candidate will typically exhibit a rapid increase of its quality metric and will thus receive continuous service until its decoding is complete, the total number of decoding iterations is reduced compared to fully processing all candidates. On the other hand, processing an incorrect candidate is quickly detected by observing that its $C_n^{(k)}(u,O)$ is not growing, or growing more slowly than that of another candidate, and/or that its $C_n^{(k)}(c,O)$ is reducing, i.e., its $\Delta^{(k)}$ becomes small or negative. In that case, the receiver 10 switches to processing the next candidate, minimizing the time and energy expended in decoding the received transmission according to incorrect candidate formats.

Figure 4:
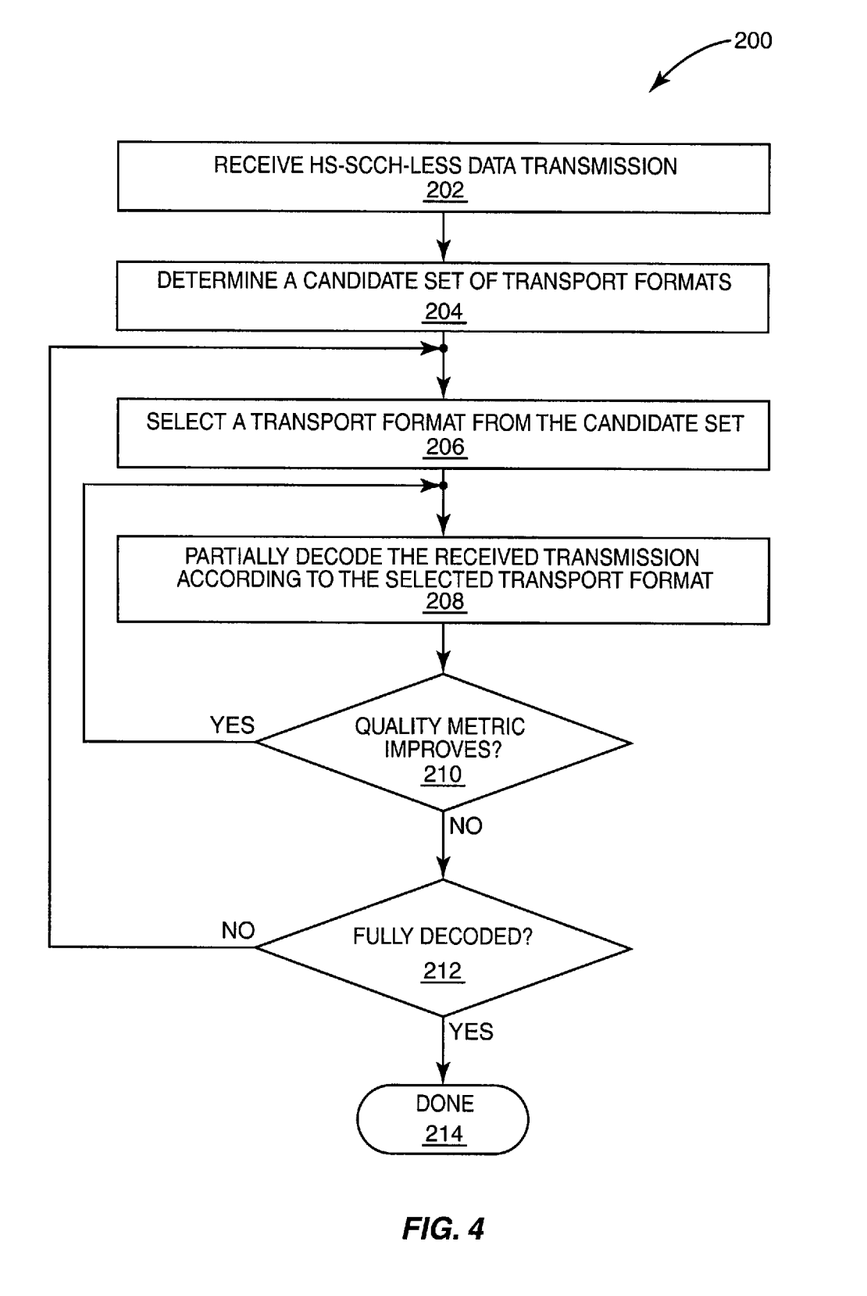
FIG. 4 is a flow diagram of a blind decoding method by partially decoding according to a plurality of transport formats.

FIG. 4 depicts a method 200 of blind decoding according to this embodiment. An HS-SCCH-less data transmission is received (block 202). The receiver 10 determines a candidate set of transport formats (block 104), which may comprise all or a subset of the allowed transport formats. The receiver 10 selects a transport format from the candidate set (block 206), and partially decodes the received transmission a predetermined number of iterations according to the selected transport format (block 208). The receiver 10 then inspects a quality metric associated with the selected transport format (block 210), such as the change in soft value outputs of the MAP decoder. If the quality metric has improved since the last set of iterations (block 210), the received transmission is further partially decoded using the same transport format (block 208). If the quality metric has not improved (block 210), if the received transmission has not been fully decoded (block 112), another transport format is selected from the candidate set (block 206) according to some fair algorithm, such as round robin, and the received transmission is partially decoded according to the new transport format (block 208). This method will rapidly fully decode (block 112) the received transmission according to the correct transport format, spending minimum time and energy partially decoding the received transmission according to incorrect transport formats. The method then terminates at block 214.

In one embodiment, additional candidates are added to the set of candidate transport formats to improve throughput in situations of missed HS-SCCH detection. In this situation, the HS-PDSCH constitutes a retransmission, using a different redundancy version, and will therefore not be correctly decoded using the standard blind decoding format set. According to this embodiment, the candidate transport format set is first tested. If none of the candidates indicate improvement ($\Delta^{(k)} < \alpha$, where $\alpha$ is an implementation dependent threshold; set $\alpha \leq 0$ if a more robust condition is desired), the receiver 10 concludes that this TTI did not contain a first HS-SCCH-less transmission. Rather, it concludes that an HS-SCCH associated with a first retransmission has been missed, and performs hybrid automatic repeat request (HARQ) combining of the current and previous HS-PDSCH transmissions. By missing the HS-SCCH in this case, the receiver 10 has lost the information on the transport format (one of at most four) and where the previous transmission occurred (6-13 subframes earlier).

Only the most likely candidate(s) should be considered in order to reduce the number of the candidates to be tested. The considered candidate(s) could for example be chosen by using the most recently used transport format and delay. Note that only one HS-DSCH of any type can be transmitted in each subframe. This should be considered in order to remove candidates corresponding to subframes where an HS-DSCH has been correctly received. This method can be applied using the mandatory 13 subframe long buffer. The additional candidates are, after HARQ combining, tested in a similar manner, checking their $\Delta^{(k)}$ and candidate(s) exhibiting sufficiently high values are decoded using the full number of iterations.

This approach is extended by adding additional candidate transport formats under the assumption that three transmissions have occurred without successful reception of either of the two HS-SCCH transmissions accompanying the two data retransmissions. The number of possible candidates in this case is 4×8×8. Only the most likely (and possible) candidates should be considered. This extension of the method requires a 26 subframes long buffer.

Figure 5:
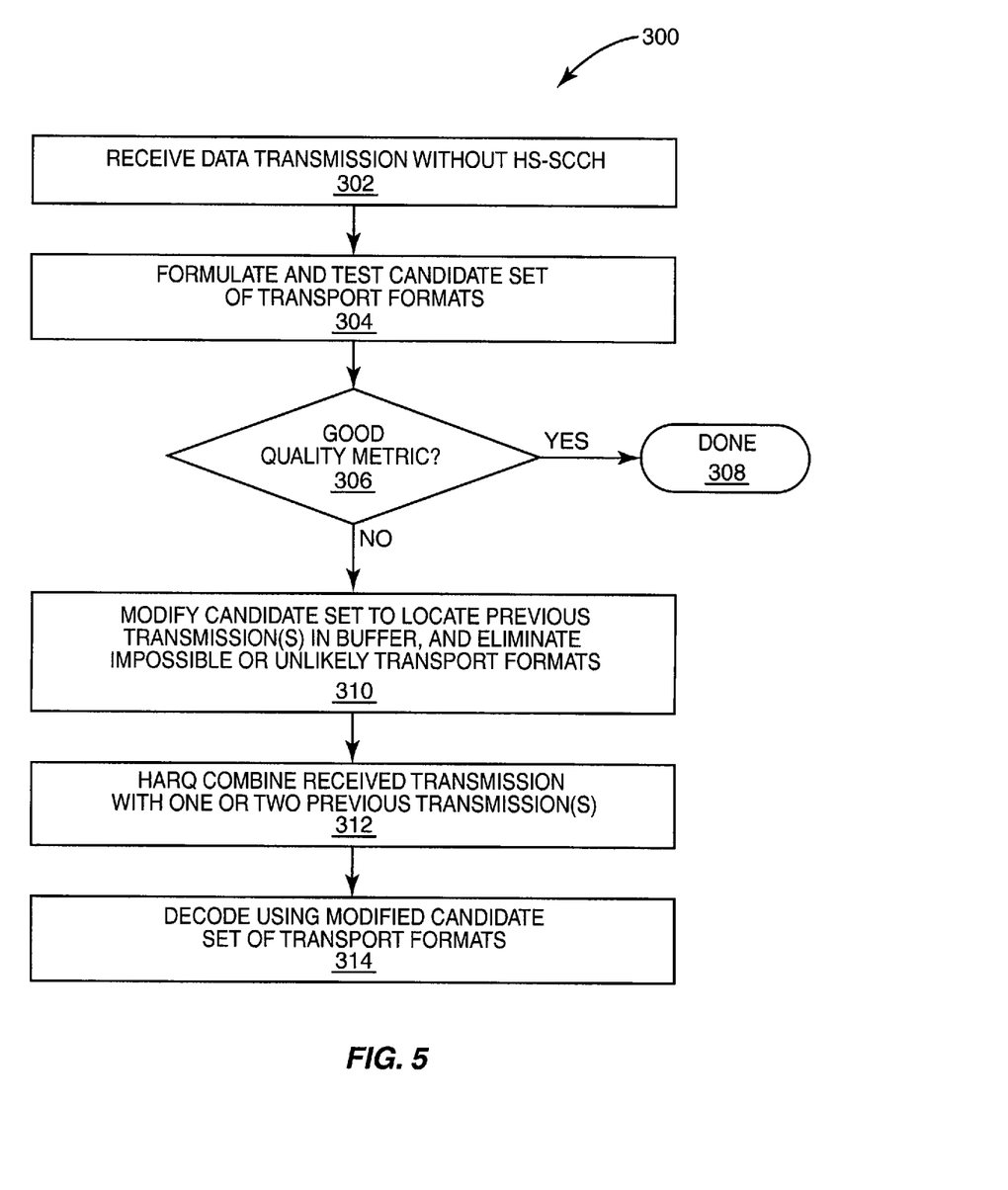

The flow diagram 300 of FIG. 5 depicts these embodiments. The receiver 10 receives a data transmission, without receiving an accompanying HS-SCCH transmission (block 302). The receiver 10 formulates and tests a candidate set of transport formats, such as by the method 200 depicted in FIG. 4. If a candidate transport format yields good quality metrics (block 306), the transmission is fully decoded and the method 300 terminates (block 308). However, if no candidate transport format yields good quality metrics (block 306), the receiver 10 assumes that the received data transmission is actually a first or second retransmission, and that it missed one or two accompanying HS-SCCH transmissions. Accordingly, the candidate set of transport formats is modified by adding a format that locates the previous transmission (or transmission and first retransmission) in the buffer (block 310). The candidate set may also be modified by eliminating impossible or unlikely transport formats. The receiver 10 then HARQ combines the received transmission with the previous transmission (or transmission and first retransmission) (block 312), and proceeds to decode the combined transmission using the modified set of transport formats (block 314).

In a related embodiment, transport formats are added to the candidate set to improve throughput in situations where the receiver 10 receives an HS-SCCH for the second retransmission but not for the first retransmission and where decoding based on the two retransmissions was unsuccessful. The missing information in this case is the time instant of the first transmission (6-13 sub frames prior to the first retransmission). The receiver 10 can choose to consider all eight candidates or a subset. One possibility is to assume that the time between retransmissions is constant. This would reduce the number of candidates to one. Note that this embodiment requires a buffer to store at least 26 subframes.

Figure 6:
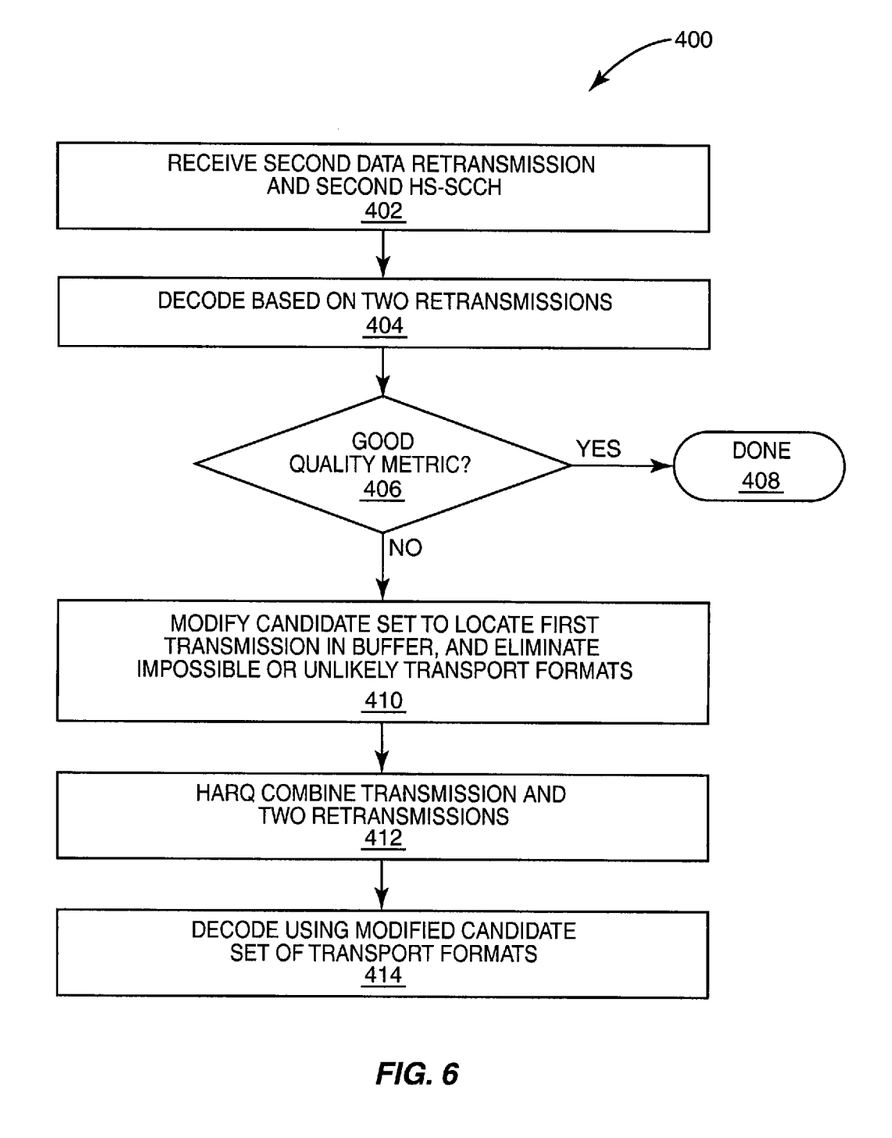

This method 400 is depicted in the flow diagram of FIG. 6. The receiver of 10 receives a second data retransmission and an accompanying second HS-SCCH, having missed the first HS-SCCH. The receiver 10 HARQ combines and attempts to decode the two retransmissions (block 404). If this is successful, yielding good quality metrics (block 406), the method 400 terminates (block 408). If the receiver 10 is unable to decode the two retransmissions (block 406), it modifies the candidate set of transport formats to include a format that locates the original transmission in a buffer (block 410). The candidate set may also be modified by eliminating impossible or unlikely transport formats. The receiver 10 then HARQ combines the original transmission with the two retransmissions (block 412), and proceeds to decode the combined transmission using the modified set of transport formats (block 414).

Embodiments of the present invention provide methods to perform blind decoding in the Release 7 context that reduce the amount of blind decoding required, and increase throughput in HS-SCCH-less operation. This allows the receiver 10 hardware to be designed more efficiently, saving chip area and hence cost, and allowing for higher levels of integration and/or reduced device size. It also reduces receiver 10 power consumption, increasing device usable lifetime between battery recharging/replacement cycles. It further improves packet data throughput, increases cell capacity, and/or lowers the interference level in the cell by avoiding further retransmissions. Furthermore, the receiver 10 may tune the number of considered candidates/and thresholds to achieve a desired balance between throughput and power consumption.

While embodiments of the present invention has been described herein in the context of blind decoding in HS-SCCH-less operation in CPC mode of HSDPA, the invention is not limited to this context or technology, but maybe advantageously applied to other situations where blind iterative decoding is used to select between a limited number of candidate transport block formats.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of decoding a transmission received by a wireless communication receiver comprising:
   receiving a transmission on a High Speed Downlink Shared Channel (HS-DSCH), to be decoded according to an associated transport format specification previously received on a High Speed Shared Control Channel (HS-SCCH);
   determining that a transport format specification associated with the HS-DSCH transmission was not received on the HS-SCCH;
   in response to the determination that the receiver lacks a transport format specification associated with the HS-DSCH transmission, determining an allowed set of transport formats, and omitting at least one transport format from the allowed set to form a candidate set of transport formats applicable to the HS-DSCH transmission;
   partially decoding the received transmission according to each transport format in the candidate set;
   associating a quality metric with each transport format based on the partial decoding; and
   fully decoding the received HS-DSCH transmission according to a transport format selected based on the quality metrics.

2. The method of claim 1 wherein omitting at least one transport format from the allowed set to form the candidate set comprises omitting a transport format not used in a preceding Transport Time Interval (TTI).

3. The method of claim 1 wherein partially decoding the received transmission according to each transport format in the candidate set further comprises fully decoding the received transmission according to each transport format in the candidate set.

4. The method of claim 3 wherein the quality metric comprises the result of an error test on the decoded transmission.

5. The method of claim 1 wherein partially decoding the received transmission according to each transport format in the candidate set comprises computing one or more iterations of a maximum a posteriori (MAP) decoding algorithm according to each transport format in the candidate set.

6. The method of claim 5 wherein partially decoding the received transmission according to each transport format in the candidate set comprises decoding the received transmission a predetermined number of iterations according to each transport format.

7. The method of claim 6 wherein decoding the received transmission a predetermined number of iterations according to each transport format in the candidate set comprises:
   decoding the received transmission a predetermined number of iterations according to a first transport format from the candidate set;
   if a quality metric generated by decoding the received transmission according to the first transport format indicates the first format is correct, continuing to decode the received transmission according to the first transport format;

if the quality metric indicates the first format is incorrect, selecting a second transport format from among the remaining candidate transport formats according to a predetermined pattern; and decoding the received transmission a predetermined number of iterations according to the second transport format from the candidate set.

8. The method of claim 5 wherein the quality metric comprises the magnitude of soft values output by a MAP decoder.

9. The method of claim 8 wherein the quality metric comprises $$C_n(x, Y) = \frac{1}{I}\sum_{i=1}^{I} |P_n(x_i, Y)|$$

where $P_n(x_i,Y)$ is the soft value for bit i related to iteration n, x is c (the coded, or demodulated bit from the previous iteration) or u (the uncoded, or information bit from the previous iteration), Y is I (Input) or O (Output), and the metric is calculated over a length-I block.

10. The method of claim 8 wherein the quality metric comprises the change in the magnitude of soft values output by a MAP decoder over successive decoding iterations.

11. The method of claim 10 wherein the change in soft values is $$\Delta^{(k)} = C_n^{(k)}(u,O) - C_{n-N+1}^{(k)}(u,I) + C_n^{(k)}(c,O) - C_{n-N+1}^{(k)}(c,I)$$

where N is the number of iterations applied at one time and k denotes each candidate transport format.

12. The method of claim 7 further comprising, if no quality metric exceeds a predetermined threshold after a predetermined number of decoding iterations, assuming a first retransmission and a missed HS-SCCH transmission;

hybrid automatic repeat request (HARQ) combining a current received data transmission with a previous received data transmission;

partially decoding the combined transmission according to a plurality of candidate transport formats;

associating a quality metric with each transport format based on the partial decoding; and fully decoding the combined transmission according to a transport format selected based on the quality metrics.

13. The method of claim 12 wherein combining the current received data transmission with a previous received data transmission comprises using the most recent retransmission delay to locate the previous received data transmission.

14. The method of claim 12 further comprising, if no quality metric exceeds a predetermined threshold after a predetermined number of decoding iterations, assuming a second retransmission and missed first and second HS-SCCH transmissions;

hybrid automatic repeat request (HARQ) combining the current received data transmission with two previous received data transmissions;

partially decoding the combined transmission according to a plurality of candidate transport formats;

associating a quality metric with each transport format based on the partial decoding; and fully decoding the combined transmission according to a transport format selected based on the quality metrics.

15. The method of claim 14 wherein combining the current received data transmission with two previous received data transmissions comprises assuming a constant retransmission delay.

16. A wireless communication system receiver, comprising:

a receiver front-end operative to receive High Speed Downlink Shared Channel (HS-DSCH) transmissions and further operative to receive a transport format specification, associated with each HS-DSCH transmission, on a High Speed Shared Control Channel (HS-SCCH);

a maximum a posteriori (MAP) decoder operative to at least partially decode received HS-DSCH transmissions;

memory operative to store a transport format specification associated with the HS-DSCH transmission, received on the HS-SCCH, and further operative to store a plurality of quality metrics, each associated with a candidate transport format used to decode a received HS-DSCH transmission; and a controller operative to detect that a transport format specification associated with the HS-DSCH transmission was not received, and in response to the detection, determine an allowed set of transport formats, and omit at least one transport format from the allowed set to form a candidate set of transport formats applicable to the HS-DSCH transmission, and wherein the controller is further operative to select a transport format from the candidate set to fully decode the received HS-DSCH transmission based on the quality metrics.

17. The receiver of claim 16 wherein the candidate transport formats comprise the most recently used of the allowable transport formats specified by a wireless communication system controller.

18. The receiver of claim 16 wherein the MAP decoder is further operative to output soft values and wherein the quality metrics are the magnitudes of the soft values associated with at least one set of decoding iterations using each candidate transport format.

19. The receiver of claim 18 wherein the quality metrics are the changes in the magnitudes of the soft values over successive sets of decoding iterations using each candidate transport format.

* * * * *